C. C. BULLOCK.
ARTIFICIAL FISH BAIT.
APPLICATION FILED APR. 26, 1920.
1,354,952.
Patented Oct. 5, 1920.
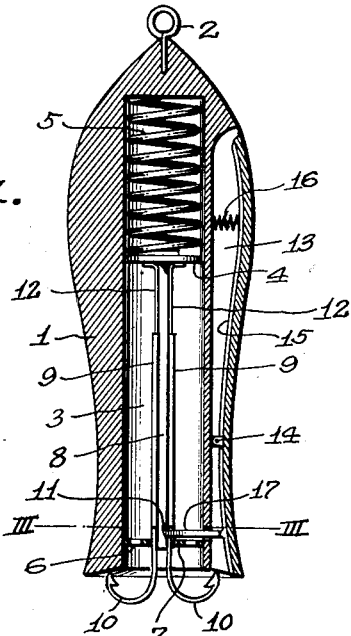
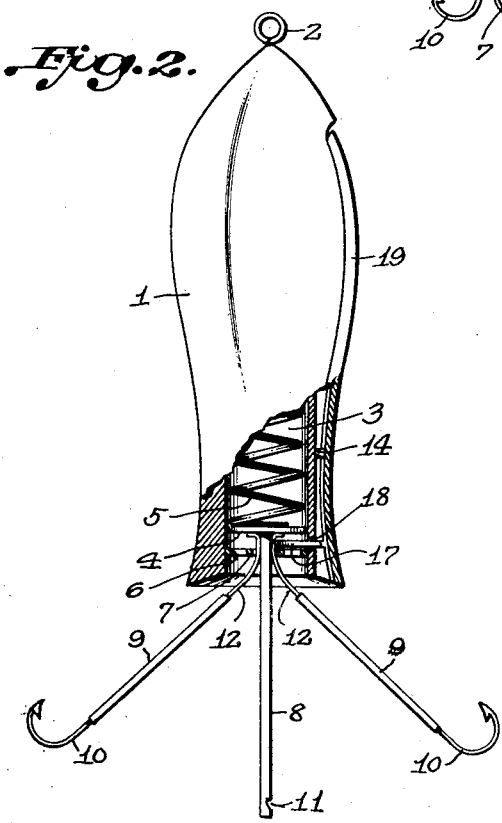
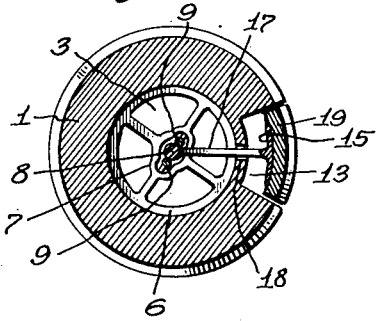
INVENTOR
Carl C. Bullock,
BY
ATTORNEYS

UNITED STATES PATENT OFFICE.

CARL C. BULLOCK, OF DETROIT, MICHIGAN.

ARTIFICIAL FISH-BAIT.

1,354,952.   Specification of Letters Patent.   Patented Oct. 5, 1920.

Application filed April 26, 1920. Serial No. 376,484.

*To all whom it may concern:*

Be it known that I, CARL C. BULLOCK, a citizen of the United States of America, residing at Detroit, in the county of Wayne and State of Michigan, have invented certain new and useful Improvements in Artificial Fish-Bait, of which the following is a specification, reference being had therein to the accompanying drawings.

This invention relates to artificial bait, and has special reference to that class of fish bait in the form of a plug or wabbler containing concealed hooks which are adapted to be released by a fish to engage in the mouth of the fish and hold the same until the fish is landed.

The primary object of my invention is to provide sensitive means for retaining spring actuated hooks in a retracted or closed position with said means disposed to be actuated by a fish closing the mouth on said means, and the arrangement of the hooks is such as to positively hook the fish and preclude any danger of the fish working free of the hook while being removed from the water.

A further object of my invention is to provide a bait of the above class wherein the hook releasing means is of such a nature as to maintain the bait in a defined position while in the water so that when the hooks of the bait are released the hooks will engage in vulnerable parts of the fish.

The above and other objects are attained by a mechanical construction, that will be hereinafter considered and then claimed and reference will now be had to the drawing, wherein—

Figure 1 is a longitudinal sectional view of the bait, showing the hooks in a retracted and set position;

Fig. 2 is a side elevation of the bait, partly broken away and partly in section, showing the hooks released, and Fig. 3 is an enlarged cross sectional view of the bait taken on the line III—III of Fig. 1.

The bait comprises a substantially minnow shaped body or plug 1 having an eye or line holding device 2 at the forward end thereof, and axially of the bait body 1 is a bore 3 having its rear end open at the rear end of the bait body.

Slidable in the longitudinal bore 3 is a head 4 which is normally pressed toward the open end of a bore by the expansive force of a coiled spring 5 within the inner end of the bore and this spring may have its inner convolution connected to the bait body and its outer convolution connected to the head 4, so as to limit the movement of the head 4 within the bore 3.

Mounted in the outer end of the bore 3 is a spider 6 which will serve as an abutment for the head 4 should the expansive force of the spring 5 carry the head into engagement therewith. The spider affords an axial guide 7 for a resetting or keeper member 8, and the shanks 9 of hooks 10. The resetting or keeper member 8 has its inner end suitably attached to the head 4 and its outer end notched, as at 11. The hook shanks 9 are attached to the head 4 by springs or resilient arms 12, and these resilient arms are maintained under compression in parallelism with the member 8 when the head 4 is retracted and the bait set. When the head 4 is projected toward the rear end of the bait and the hook shanks 9 released by the spider guide 7, the resiliency of the arms 12 distends the hooks and places the same in diverging relation, as shown in Fig. 2, and it is this sudden release of the hooks which causes the same to engage in the mouth or throat of a fish and holds the same until removed from the water. With the hook shanks against the resetting or keeper member 8 the spider guide 7 retains the hooks closed, and to hold the head 4 retracted with the spring 5 under compression a latch and trigger are employed which will now be considered.

The wall of the bait body 1 is provided with a recess 13 and pivoted in said recess, as at 14 is a trigger 15 approximately the same length as the recess. At the front end of the trigger there is a coiled expansion spring 16 within the recess 13, and the expansive force of this spring retains a latch 17 of the trigger normally in the notch 11 of the resetting or keeper member 8. The latch 17 is carried by the trigger adjacent its rear end, and said latch extends through an opening 18 into the bore 3 at the inner side of the spider 6.

Suitably connected to the trigger 15 is a cover 19 having a contour as a continuation of the outer wall of the bait body and said cover somewhat closes the recess 13 so as to prevent weeds and foreign matter from interfering with the operation of the trigger. The cover is preferably made of cork so as to be more buoyant than the bait body and thus maintain the bait body right side up, that is, with the cover on top, when the bait body is in a body of water. The cover may be finished to correspond with the exterior finish with the bait body or may be made more attractive so that a fish will positively strike at the cover portion of the bait.

When the front end of the trigger is compressed by a fish closing the mouth on the artificial bait the latch 17 is retracted and the resetting or keeper member 8 released permitting the hooks 10 to distend as shown in Fig. 2. The resetting member 8 may be conveniently used for resetting the bait without necessarily subjecting the resilient arms 12 to any unnecessary stresses or strains.

By reference to Fig. 1 showing the bait set it will be noted that the barbs and bills of the hook are somewhat protected by the rear end of the bait body and in consequence of this compact arrangement the bait may be easily cast and drawn through a body of water without any danger of the hooks becoming entangled with weeds or debris.

One embodiment of my invention has been illustrated, but it is to be understood that the structural elements are susceptible to such variations and modifications as fall within the scope of the appended claim.

What I claim is:—

An artificial bait comprising a body, hooks in said body adapted to be projected therefrom and in diverging planes, projecting means in said body for said hooks, and means including a trigger having a cover more buoyant than the body of the bait forming a part of the wall of said body adapted to hold said hooks retracted relative to said body.

In testimony whereof I affix my signature in the presence of two witnesses.

CARL C. BULLOCK.

Witnesses:
 LEWIS E. FLANDERS,
 ANNA M. DORR.